United States Patent
Adarve Lozano

(10) Patent No.: US 11,414,207 B2
(45) Date of Patent: Aug. 16, 2022

(54) SYSTEM FOR LOCATING THE POSITION OF THE END OF THE BOOM, THE MOUTH OF THE REFUELLING VESSEL AND THE TANKER

(71) Applicant: DEFENSYA INGENIERÍA INTERNACIONAL, S.L., Madrid (ES)

(72) Inventor: Alberto Adarve Lozano, Madrid (ES)

(73) Assignee: DEFENSYA INGENIERÍA INTERNACIONAL, S.L., Madrid (ES)

( * ) Notice: Subject to any disclaimer, the term of this patent is extended or adjusted under 35 U.S.C. 154(b) by 751 days.

(21) Appl. No.: 15/767,134

(22) PCT Filed: Oct. 6, 2016

(86) PCT No.: PCT/ES2016/070713
§ 371 (c)(1),
(2) Date: Apr. 9, 2018

(87) PCT Pub. No.: WO2017/051057
PCT Pub. Date: Mar. 30, 2017

(65) Prior Publication Data
US 2019/0071188 A1     Mar. 7, 2019

(30) Foreign Application Priority Data
Oct. 9, 2015 (ES) .............. ES201531460

(51) Int. Cl.
*B64D 39/00* (2006.01)
*G06T 7/20* (2017.01)
(Continued)

(52) U.S. Cl.
CPC .......... *B64D 39/00* (2013.01); *B64D 39/06* (2013.01); *G01S 17/88* (2013.01); *G01S 17/933* (2013.01);
(Continued)

(58) Field of Classification Search
CPC ........ B64D 39/00; B64D 39/04; B64D 39/02; B64D 39/06; G01S 17/88; G01S 17/89;
(Continued)

(56) References Cited

U.S. PATENT DOCUMENTS 3,610,821 A * 10/1971 Narbaits-Jaureguy ...................... G01C 5/005 348/117
4,025,193 A    5/1977 Pond et al.
(Continued)

FOREIGN PATENT DOCUMENTS

| EP | 2879312 A1 | 6/2015 |
| WO | 0102875 A2 | 1/2001 |

OTHER PUBLICATIONS

Spanish Patent Office, "International Search Report" in connection with related International Application No. PCT/ES2016/070713, dated Nov. 17, 2016, 14 pgs.

*Primary Examiner* — Assres H Woldemaryam
(74) *Attorney, Agent, or Firm* — Kolisch Hartwell, P.C.

(57) ABSTRACT

A system for locating the end of a boom and that of a refueling vessel in a mid-flight refueling operation from a tanker that includes means for locating the position of the inlet mouth of the fuel that is inside the vessel of the receiving plane that comprise at least one vision subsystem arranged on the tanker. Also included are means for locating the position of the boom tip comprising light emitters, placed on the boom tip, along with the vision subsystem arranged on the tanker, and processing means constructed to use the images obtained from the locating means to allow their positions and inclinations to be exactly determined with respect to a common coordinate system.

16 Claims, 10 Drawing Sheets

(51) Int. Cl.
  *G01S 17/88* (2006.01)
  *B64D 39/06* (2006.01)
  *G01S 17/933* (2020.01)
  *G05D 1/10* (2006.01)

(52) U.S. Cl.
  CPC ............ G05D 1/104 (2013.01); G06T 7/20 (2013.01); *G01S 2205/005* (2013.01)

(58) Field of Classification Search
  CPC . G01S 17/933; G01S 2205/005; G05D 1/104; G06T 7/20; G06T 2207/30212
  See application file for complete search history.

(56) References Cited

U.S. PATENT DOCUMENTS

| | | | |
|---|---|---|---|
| 5,499,784 A * | 3/1996 | Crabere | B64D 39/00 244/135 A |
| 5,530,650 A * | 6/1996 | Biferno | B64D 39/00 244/172.4 |
| 5,906,336 A * | 5/1999 | Eckstein | B64D 39/00 244/135 A |
| 6,604,711 B1 * | 8/2003 | Stevens | B64C 39/024 244/135 A |
| 6,752,357 B2 | 6/2004 | Thal et al. | |
| 6,889,941 B1 * | 5/2005 | McElreath | B64D 39/00 244/175 |
| 6,926,049 B1 * | 8/2005 | Enig | B64D 39/04 137/615 |
| 6,966,525 B1 | 11/2005 | Schroeder | |
| 7,681,839 B2 * | 3/2010 | Mickley | G01S 1/70 244/135 A |
| 7,980,512 B1 * | 7/2011 | Speer | C07D 271/113 244/135 A |
| 8,497,479 B1 * | 7/2013 | Garman | G01J 5/08 250/352 |
| 9,284,061 B2 * | 3/2016 | Kutzmann | B64D 39/04 |
| 9,315,277 B2 * | 4/2016 | Foo | B64D 39/02 |
| 9,878,777 B2 * | 1/2018 | Bernhardt | B64C 23/00 |
| 10,035,606 B2 * | 7/2018 | Iverson, Jr | B67D 7/04 |
| 2003/0205643 A1 * | 11/2003 | von Thal | B64D 39/00 244/135 A |
| 2003/0209633 A1 * | 11/2003 | Thal | B64D 39/06 244/135 A |
| 2005/0012684 A1 * | 1/2005 | Hewitt | H04N 13/122 348/E13.067 |
| 2005/0198750 A1 * | 9/2005 | Spencer | B64F 1/002 14/71.5 |
| 2006/0038076 A1 * | 2/2006 | Schroeder | B64D 39/04 244/135 A |
| 2006/0060709 A1 * | 3/2006 | Thal | B64D 39/06 244/135 A |
| 2006/0208132 A1 * | 9/2006 | Jones | B64D 39/00 244/10 |
| 2006/0214059 A1 * | 9/2006 | Smith | B64D 39/06 244/135 A |
| 2006/0278760 A1 * | 12/2006 | Carns | B64D 39/06 244/135 A |
| 2006/0284019 A1 * | 12/2006 | Takacs | B64D 39/00 244/135 A |
| 2007/0023570 A1 * | 2/2007 | Bernard | B64C 13/20 244/75.1 |
| 2009/0095843 A1 * | 4/2009 | Powell | B64D 39/00 244/135 A |
| 2009/0127394 A1 * | 5/2009 | Adarve Lozano | B64D 39/00 244/135 A |
| 2012/0049003 A1 * | 3/2012 | Richardson | B64D 39/00 244/135 A |
| 2012/0153084 A1 * | 6/2012 | Etzkorn | B64D 39/00 244/135 A |
| 2012/0261516 A1 | 10/2012 | Gilliland et al. | |
| 2012/0318929 A1 * | 12/2012 | Golling | B64C 13/18 244/203 |
| 2013/0168497 A1 * | 7/2013 | Rix | G05D 1/101 244/135 A |
| 2015/0206439 A1 * | 7/2015 | Marsden | G08G 5/045 701/301 |

* cited by examiner

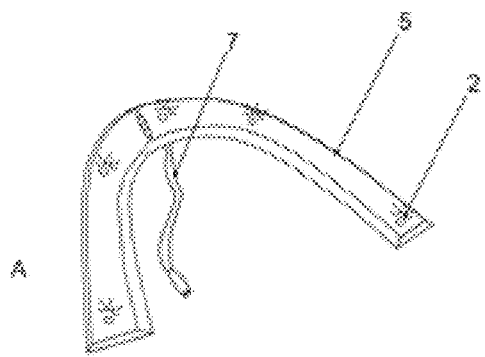
FIG. 4A
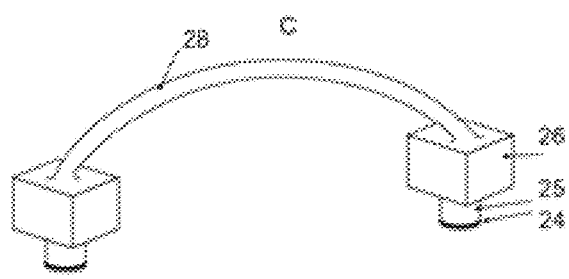
FIG. 4C
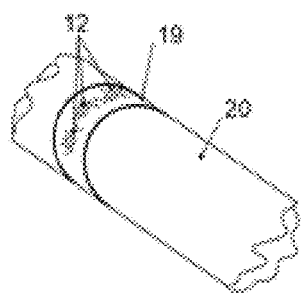
FIG. 4B
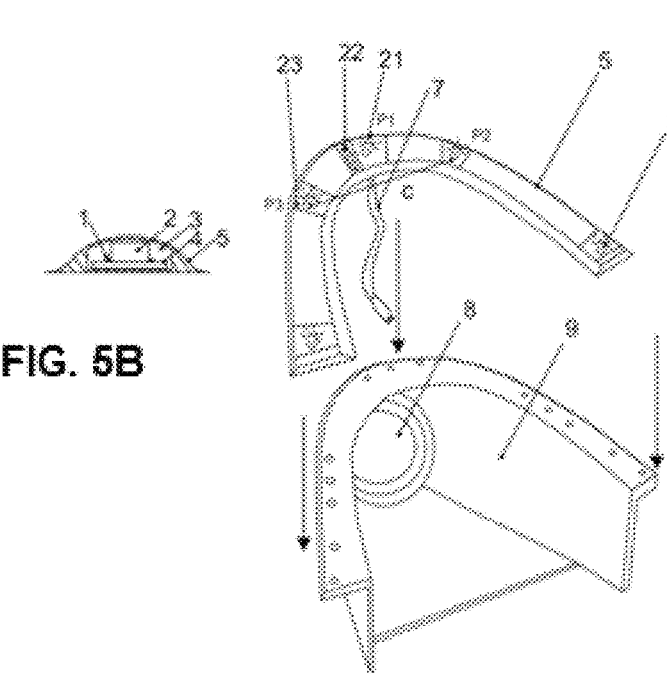
FIG. 5B
FIG. 5A
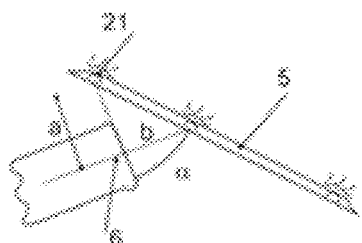
FIG. 5C
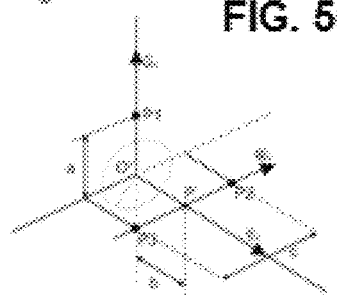
FIG. 5D

SYSTEM FOR LOCATING THE POSITION OF THE END OF THE BOOM, THE MOUTH OF THE REFUELLING VESSEL AND THE TANKER

OBJECT OF THE INVENTION

The object of this invention, as the title of the invention establishes, is a System for locating the position of the end of the boom, the mouth of the refueling vessel and the tanker itself, with the boom being understood as the in-flight refueling pole or boom formed by a rigid telescopic tube with mobile flight control surfaces which a tanker aircraft operator can extend and insert into the receiving aircraft's vessel.

Refueling operations involve three important points: the initial approach of the receiver to the tanker; the placement of the receiver in a position which is optimal for the refueling; and the contact between the boom's nozzle and the receptor vessel to start supplying fuel. The System or set of elements described herein allow these operations of approach, positioning and contact to be performed prior to refueling which are currently manual, in a semi-automatic and even automatic manner with great safety, precision and robustness and even help the receiver maintain its position more easily when it is being supplied with fuel. Thanks to these devices, the part of the System in the receiver is able to obtain the position of the tanker for its approach and the part of the System inside the tanker is able to precisely determine the location and the inclination of the vessel in which the boom must be entered, as well as the position and inclination of the end of the latter, to which the operation is limited, in order to develop adequate control laws to allow such contact.

Therefore, this invention is noteworthy due to the fact that it allows a mother plane to refuel a receiving plane in a semi-automatic and even automatic manner.

Thanks to the joint collaboration of the means available for the System, the tanker boomer or refueling operator can accurately determine the location and inclination of the vessel in which the Boom must be entered as well as the position and inclination from the end of the latter in order to aid the operation. An automated system based on the information obtained by this invention is also completely viable.

The invention consists of means for locating the position of the tanker from the receiver, means for locating the receiver from the tanker, in other words, where the receiver is exactly placed in the space, and on the other hand means for locating the end of the boom, which allow their positions and relative inclinations to be precisely determined. All this in relation to a common coordinate system and therefore the possibility of enabling an approach through automatic means, if the laws that control both, i.e. the Boom and receiving plane, are designed appropriately, and based on this information provided by this invention for its final approach and contact.

The system presented herein has several clearly distinguished versions depending on the way in which the position of the receiver's vessel is obtained, each one with different advantages according to the implementation chosen. Both of them obtain the position of the end of the boom, in particular the nozzle, from the location of certain points of light placed on the end of the boom, in the images obtained from a set of two cameras strategically placed in the tank. They obtain the position of the mouth of the receiving aircraft's vessel using means for locating the position of the receiver, using either a series of LEDs, lasers, or light emitters arranged on the receiver plane along with the cameras placed on the tanker aircraft, or a ToF (Time-of-flight) camera or a laser emitter with a DOE pattern, also in conjunction with the cameras placed under (on the tanker's fuselage or external surface, but below it, such as on the lower area of the tail cone or belly-fairing on the plane's underside) the tanker.

As has also been indicated, the object of the present invention is a System for approaching and locating the tanker from the receiver, based on the previous system which, conveniently complemented, allows the semi-automatic or automatic approach of the receiver to the tanker, which results in an automation of the entire refueling process in mid-flight.

It can therefore be considered that this invention is confined within the scope of the in-flight refueling systems, and particularly among those relating to the boom positioning systems in the vessel of the aircraft to be refueled.

BACKGROUND OF THE INVENTION

In-flight refueling is currently carried out in two different ways. With hoses and baskets, or with a Boom. In the case that it is carried out with a Boom, the end or nozzle (fuel outlet nozzle) of the Boom must be placed in a vessel found on the surface of the plane that is going to receive the fuel. This entire operation is currently carried out manually and relies on the expertise of the operator or boomer.

U.S. Pat. No. 6,966,525B1 is known in the state of the art, which describes an in-flight refueling system, and where the alignment system and the method are provided to substantially automate the positioning and commitment of an in-flight refueling system performed by a first aircraft with respect to a refueling vessel supported by a second aircraft in order to facilitate the refueling operation between the first and the second aircraft. More specifically, this patent provides means for aligning the refueling pole mid-flight with the refueling vessel in such a way that an extendible nozzle can be extended from the refueling extendible arm mid-flight and hook up to the refueling vessel to initiate an in-flight refueling operation.

Another patent of the state of the art related to the invention is U.S. Pat. No. 6,752,357, which describes an Aircraft distance measurement system that analyses the images of at least one camera using the known length of refueling extendible arm, the location of the nozzle in order to identify a distance between the boom nozzle and the refueling vessel of the receiving aircraft. In other words, the aim is to calculate the distance between the boom's nozzle and the receiving vessel to refuel the aeroplane.

Certain other systems give details of means for locating the position of the receiver, but no system uses means to locate the tip of the BOOM, and similarly no system gives details of both means for locating the vessel and the tip of the boom.

All previous systems rely on the expertise of the operator or boomer in order to be operated, as they are ultimately manual operations.

Therefore, the object of this invention is also to develop a system that enables semi-automatic or automatic refueling that does not depend on the expertise of the operator to correctly position the end of the boom in the vessel on the surface of the plane, developing a System such as the one described below and is essentially included in the first claim, enabling semi-automatic and even automatic refueling

DESCRIPTION OF THE INVENTION

The main part of the Location System invention comprises Means for Locating the Position of the Receiver, in order to determine exactly where and how the receiver is positioned in the space, and on the other hand Means for Locating the position of the end of the boom, which allow the positions and inclines thereof in relation to a common coordinates system to be determined exactly and therefore allow the possibility of approach by automatic means if the laws that govern both, that is the boom and the receiver aircraft, are appropriately designed and based on said information supplied by the invention for the final approach thereof and contact.

This basic system for locating the end of the boom and that of the refueling vessel in a mid-flight refueling operation from a tanker equipped with a boom (15) to a receiving plane comprises:

Means for Locating the Position of the Receiver in the receiving plane that comprise at least one Vision Subsystem arranged on the tanker.

Means for Locating the Position of the Boom tip comprising light emitters, placed on the boom tip, along with the Vision Subsystem arranged on the tanker.

Processing Means in which, through the images obtained from the localisation means allow their positions and inclinations to be exactly determined with respect to a common coordinate system.

The Means for Locating the Position of the Receiver may include:

In an initial embodiment, which we will call the Vessel Device, the means consist of a series of LEDs or lasers, or light emitters arranged on the receiver plane along with the cameras placed on the tanker aircraft.

In a second embodiment, they can consist of a ToF camera, which when placed on the tanker plane allows the position of the receiver to be known without needing to place any means on the receiving plane. This ToF camera, also known as flight time, consists of lighting elements and a matrix sensor that measures the time it takes the light to return once sent. This information will provide us with the distances from this new camera to the receiver and will be incorporated into the Vision Subsystem to replace the Vessel Device. We can use the distances to the receiver that the flight time camera provides us with to obtain a set of points on the surface of the receiving aircraft that, together with an algorithm which recognises or compares the surface of the same receiver plane previously digitised and stored, will provide the location of the vessel's mouth in an alternative manner to that provided by the Vessel Device, thereby allowing this device to be replaced by the use of the designated ToF camera.

In a third embodiment, the Means for Locating the Receiver position consist of a laser emitter or illuminator, placed in the tanker, to which a DOE or diffraction lens generating a structured illumination that creates a known light pattern has been added on the surface of the receiver and which, along with a processing subsystem and any of the two Vision Subsystem cameras, allows the distances to them from any of the two cameras to be obtained through basic telemetry. This matrix information on distances, either through means of recognition by comparison between the points of the matrix and the same points on a 3D image model of the receiver itself, enable information to be obtained on the position equivalent to that obtained by the Vessel Device and thus provides the same functionality as the device, potentially replacing it by rendering it unnecessary.

The Means for Locating the tip of the Boom comprise light emitters, which may preferably, but not essentially, be LEDs, laser emitters or the ends of optical fibres that conduct the light of any of the above and have lenses or diffuser elements attached to their ends, placed on the tip of the boom, along with the cameras arranged on the tanker (of the Vision Subsystem).

The Processing Means comprise control electronics that switch the light emitters of the Boom Device on and off. They also have video signal processing electronics to calculate information on the distance to the light emitters of other devices. They also have enough computing power to analyse point clouds, recognise certain patterns in them, and compare them with other point clouds.

The Location System aims to produce fundamental information that forms the basis of the invention. This information consists of:

The spatial location of the end of the boom that is represented by the "nozzle" that dispenses the fuel, as well as the inclination thereof, which will be materialised by a point (x, y, z) in the space along with a vector (Vx, Vy, Vz) parallel to the direction of the removable part of the boom where said nozzle is located.

The spatial location of the fuel inlet mouth that is inside the vessel, which as mentioned, is located on the upper surface of the receiving plane, along with the inclination of the tube that flows into it. Both equally represented by a point of three coordinates and a vector of three components parallel to the mentioned tube A third point of information for the case of the approach and location system is the location of the tanker relative to the receiver, as well as the relative inclination between both. This would serve as an approximation tool in the initial phase of contact.

The references relating to the location of the boom end and the fuel inlet port are represented, as already mentioned, by a set of six coordinates, each of which refer to a coordinate axis attached to the tanker and for the purpose of convenience, the origin of said axes will be placed in one of the two chambers that are used in this invention for obtaining the indicated locations. The origin O, therefore, will be in the centre of the sensor of said chamber and its z-axis will be perpendicular to the surface of the sensor, the OX and OY axes being parallel to the plane of said sensor, the positive Y and horizontal axes above and the growing Xs axis to the right.

Said information is obtained based on the data obtained by the Vision Subsystem that forms part of the invention, both in the complete and short versions and which consists mainly of two cameras and other electronic elements that will be detailed below. This camera subsystem captures the light emitted by two devices that, as already mentioned, are placed on the tip of the Boom and on the vessel of the receiver plane, respectively. In addition, and as will be detailed below, the information corresponding to each device will be stored in order to facilitate future and subsequent contact between both.

For future references to the elements that make up the short version of this invention, in this document, we will talk about the "Vessel Device", "Boom Point Device" and "Vision Subsystem", when referring to the three simplified Location Devices that constitute this invention, leaving only the initial approach of the receiver to the tanker to be dealt with in the full version of the invention, as already commented.

The simplified invention, relating to the location of the end of the boom and the mouth of the vessel, is comprised of three elements: a Vessel Device, a Boom Device and a Vision Subsystem, which is formed by a set of at least two cameras, where the cameras and the boom device are electrically connected to each other and placed in the tanker, while the communication with the vessel device, which is on the surface of the receiver, is based on communication via emitted light and a receiving sensor. This communication is two-way, in other words, it works in both directions: The receiving plane emits light through an active element and receives through the tanker aircraft's cameras. While the tanker also emits through an active light element placed in the boom and receives through means of an image sensor which is not necessarily a matrix in the plane's fuel receiver. This last communication occurs almost exclusively at the time of contact between the two planes when the theoretical transfer of fuel takes place and the situation and relative distance between both is optimal.

These fundamental elements or parts are described in more detail below:

Vessel Device which is found on the receiver plane, in a preferred embodiment, consists of a semi-hollow steel band of high shock resistance that includes at least four transparent zones of material also of high strength such as graphene, aluminum oxide or similar, within which at least three elements that provide light are embedded and a fourth element consisting of a sensor that receives and detects light from another device. Optionally, this device may have two reduced-size cameras embedded in it. This will allow the light emitted by another device similar to the one described now to be "seen", with the device being placed on the tanker, and thus for the relative situation of the same with respect to this receiver to be determined. The device will be fixed to the receiving aircraft via gluing, screwing, riveting or a similar procedure.

This device is placed on the vessel of the receiving plane. Its box consists of a shock-resistant frame that may be made of steel, titanium, Teflon, Kevlar or another high-strength material with a wide range of operating temperatures. In this frame, the light emitters and the sensor that have been discussed above are embedded. These emitters must be able to emit light with sufficient intensity so that the tanker's cameras can "see" them in daylight and will emit the position information that the cameras need to locate them properly with their light. Each camera will "see" each emitter in a position (x, y) within its range of positions that the pixel matrix of its image sensor will provide.

This pair (x, y) corresponds to a line placed in the space and which refers to certain coordinate axes defined by the camera itself. The use and change mode of two cameras allows us, through the use of geometry, to determine the point of intersection of both lines and therefore the situation of the light seen by both cameras with respect to a coordinate axis fixed to the cameras. These lights will consist of an LED or LASER emitter that, when turned on, will send control information and other information such as an appropriately compressed and digitised voice signal by means of a binary and redundant code, as detailed below. This sending of information is processed simply through a set of consecutive pulses with a certain cadence pattern when information on the location of the vessel or the digitised information itself is being sent, provided this is not control information.

By way of example, when the information does not involve a location, it may be sent with the following format: Header+L+Data+CRC16. Where the header is a 16-bit string to indicate the beginning of a message, L is the length in bits of the data with up to 8 bits for L, leading to a maximum of 255 bits of data. CRC is a 16-bit cyclic redundancy code. The data may include a synchronisation clock between the subsystem and the device. If the information to be transmitted is voice information, it will be digitised, compressed and sent with simple error correction codes and longer frames.

The subsystem will be powered via a connection to the receiver's power supply which will also include a control wire that will act as permission for the emission of the stored code from inside the receiving plane.

In order to ensure that the light emitters can be properly seen, even in conditions with a high level of solar brightness, and to avoid confusion with other sources of light from the ground or from other aircraft, the method employed in this invention consists of using aids simultaneously which provide very positive practical results: Firstly, the light emitted is confined within a spectrum band with a very narrow wavelength range and a high temporal coherence. The rest of the wavelengths are eliminated through an equally narrow bandpass optical filter, placed in front of the camera lenses. This gives us a greatly improved relative value of emitted light compared with the ambient light. At the same time, as a second aid, we make the emitted light flicker with a defined pattern. In this way, for a pixel received as a consequence of the reflection of the light emitted with that pattern in a point of our image, we obtain values that must follow that same pattern. Thus, if we use a frequency the same as that used in the camera (number of frames per second), we can take the values of the pixels in consecutive frames and make a correlation with the pattern of light emitted. The pixels whose correlation value exceeds a certain threshold will indicate to us that they have been illuminated by our emitters. The combination of both methods allows us to "see" with sufficient clarity those light emitters from our image with our Vision Subsystem with the precision that the resolution of these cameras allow and taking into account that working distances are relatively low, a subcentimetre resolution can be reached, with total guarantee and without too much difficulty. The Vessel Device also has a sensor whose input signal is filtered and optically amplified, and also accompanied with a certain pattern for "zero" and another pattern with a "one". The light signals coming from the other device or the Boom Device will arrive without complications to this sensor when contact has been made between the nozzle and the vessel or when there is near-contact, meaning that they are very close to each other. This procedure will allow communications of 48K Baud, which means that a spoken conversation could easily be transmitted through this link and method. Finally, the device includes electronics with the function of extracting the voice signal or data, where appropriate, or generating pulses from its light emitters at the appropriate times. A more advanced version of this device will include two additional cameras as well as processing electronics similar to those of the Vision Subsystem.

Boom Device:

This second device consists of a protection and support box that protects certain light emitters on the tip of the boom.

The Boom Device consists of a box that houses the electronics and light emitters necessary for the required functionality. This box must have a means to grip the boom. It may be a ring or a similar element that meets the above conditions. In a preferred implementation, the box has two half-rings that grip it to the front area of the boom's nozzle. The box contains the drivers of the LEDs used in this implementation, which provide them with the necessary current to be turned on and off according to the established guidelines. These electronics must also include the necessary protections for the rest of the electronics as well as a voltage adapter to convert the voltage supplied by the aircraft to that required by the drivers and other electronics in order to function. On the outer surface of the box, in a plane orthogonal to the axis of the boom, the LEDs are arranged so that one of them is as close as possible to the centre of the Vision Subsystem cameras and the other two are symmetrically placed with respect to this minimum distance to the inside of the cameras. This is a minimum configuration and additional LEDs can be placed to obtain additional redundancy at the expense of a more intense calculation. The duration of the LED lighting will be the same as the time frame of the cameras when said lighting occurs and will be synchronised with them, for both turning them on and off. The proposed box will be aluminum and its shape and size will be compatible with the geometry of the boom to avoid geometric interference that leads to friction or collisions with other parts of the aircraft or the boom itself.

In a more complete version, this device can include cameras that would see the receiver from a privileged situation at the time of contact.

Both previous devices will emit diffused light that will be captured by the Vision Subsystem, which when processing it will obtain the relative position between both elements and from there through a Control System, the ability to establish contact with little or no human intervention.

Vision Subsystem:

This is comprised mainly of a set of cameras, at least two, whose function is to observe the scenario of the operation in which the other indicated devices exercise their fundamental role of signaling the position of their respective locations, from which the information that will be derived will be deducted. This in turn will allow us to establish guaranteed contact between the nozzle and vessel. In a preferred implementation, these cameras are prepared to see the light emitted by the emitters placed in the other devices of this invention at working distances. This will involve requirements such as a good resolution, 1080 in our case, notwithstanding other resolutions. An acquisition frequency of at least thirty frames per second and a working spectrum that includes infrared. An electrical connection will synchronise the turning on of the LEDs as preferred emitters of the Boom Point Device, with the image frame being acquired by the cameras' image sensors.

The essence of the proposed system lies in the simplicity with which active light emitters in a narrow range of the spectrum and with a wide angle of diffusion can easily be seen from a large area, at distances of tens of metres, necessary for these types of operations and in all kinds of ambient light conditions, with the use of cameras with their corresponding filters and employing pulse coding techniques. In the complete system which is also object of this invention, the additional functionality of initial approach between receiver and tanker is covered by the same techniques and the same type of devices: adding a Vision Subsystem in the receiving aircraft and light emitters next to the tanker's Vision Subsystem.

In the broadest case of an approach and location system, the system comprises three locating devices for refueling, one arranged on the receiving vessel, another on the tanker and another on the tip of the boom.

Each of the Refueling Devices comprises:

At least three LED- or Laser-type light emitters, or a combination of both, each with a wide-angle diffuser to diffuse the light they emit. Each light emitter will be powered by its respective driver, and all commanded by a control electronics unit.

At least two high-speed vision cameras (>30 fps), with their respective lenses and narrow bandpass optical filters, tuned to the light emitted by another collaborating device. The cameras will have high-speed fpga-type or similar electronics to determine the coordinates of the points of light emitted by another Locating Device collaborator in real time.

A light sensor with its respective lens capable of detecting light from another collaborating Locating Device when it is nearby.

Electronic equipment that processes the coordinates provided by both cameras to obtain the relative coordinates of each emitter with respect to one of the cameras. Furthermore, in order to provide this information to the rest of the aircraft for use in assisting refueling, there will be a communication bus for all of the electronic equipment, both for controlling and recognising/processing, with the exterior of the device. The positional contact information will also be stored in a memory in order to make it available in future occasions.

The electronic equipment will perform at least the following functions:

Calculation of x, and of each light emitter displayed by each camera.

Calculation of X, Y, Z of each point of light displayed simultaneously by both cameras.

Calculation of the Xp, Yp, Zp as well as Vpx, Vpy, Vpz of the relevant point rigidly linked to the previous ones as well as a vector perpendicular to the relevant surface attached to it.

Storage of the previous information.

Sending of the previous information to the exterior.

On and off switch for the light emitters.

Recognition by correlation of the consecutive frame pixels of the sequences corresponding to the light emitters of another collaborating Locating Device.

Extraction of the data of the high-speed light signal.

The cameras of all of the vision subsystems can have controllable and variable focus, and they can also have controllable and variable Iris and/or zoom.

In a possible embodiment, the Boom location means can be integrated into the boom itself.

Also, in a possible embodiment, the vessel may be configured so that the vessel locating means are integrated into the vessel itself.

In the operations shown above some of the elements or parts that constitute it can be replaced by similar elements currently existing in the plane and to which they have been provided with the new specific functionality contained in this invention when adding either new elements or new functionalities with the purpose of obtaining the functionalities described for this entire invention, thus bypassing as far as possible the installation of new devices in the aircraft.

Unless otherwise indicated, all technical and scientific elements used herein have the meaning commonly understood by standard experts in the art to which this invention pertains. Methods and materials similar or equivalent to those described in the specification can be employed when using this invention.

Throughout the description and the claims the words "comprises", "consists" and its variants are not intended to exclude other technical characteristics, additives, components or steps. For experts in the art, other objects, advantages and characteristics of the invention will emerge partly from the description and partly from the practice of the invention.

EXPLANATION OF THE FIGURES

To supplement the description being given and with the aim of promoting a better understanding of the characteristics of the invention, in accordance with a preferred example of a practical embodiment of the same, a set of drawings are provided as an integral part of the description in which, for merely illustrative purposes, the following has been represented:

FIGS. 4A, 4B and 4C represent the three different devices or subsystems that comprise this invention.

FIG. 5A depicts the first of the devices of this invention shown in FIG. 4A in more detail.

FIG. 5B shows a cross section of the Vessel Device.

FIG. 5C represents a cross section of that part of the receiver.

FIG. 5D is a Cartesian representation of the elements of FIG. 5C.

PREFERRED EMBODIMENT OF THE INVENTION

In view of the Figures, a preferred embodiment of the proposed invention is described below.

Figure 1:
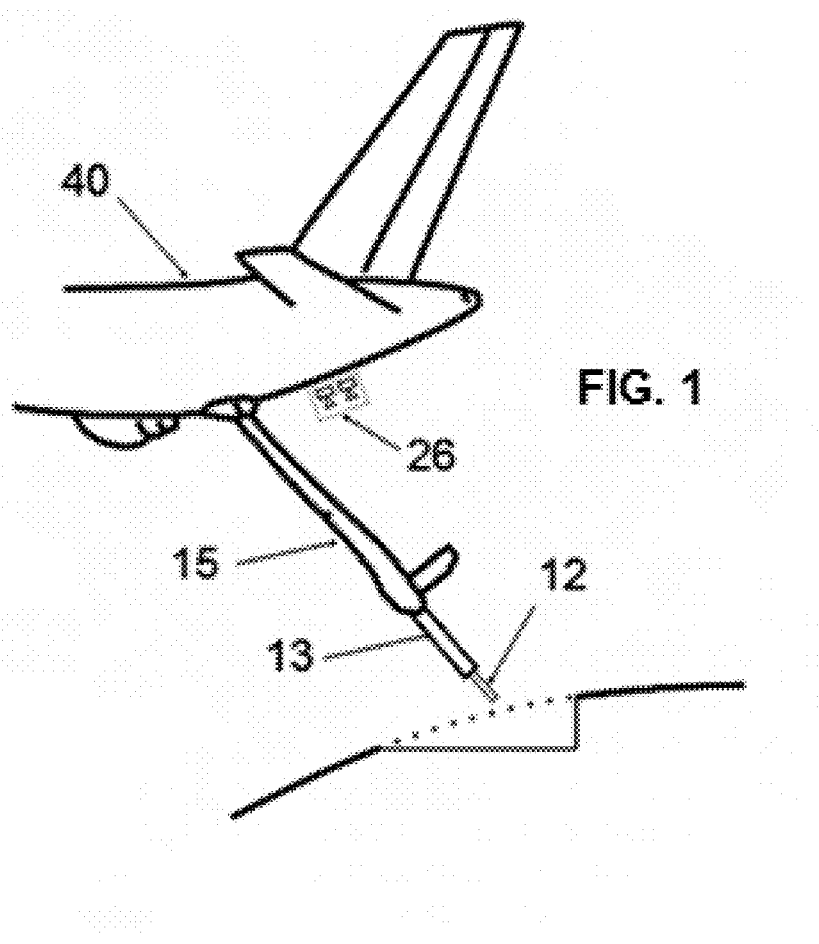
In FIG. 1, we can observe a simplified representation in a first embodiment of the System for Approaching and Locating the end of the Boom and the mouth of the Vessel.

FIG. 1 shows a mother plane or tanker (40) provided with a boom (15) that has an extendible part (13), at the end of which the first light emitters (12) can be found, while the second light emitters (2) are arranged on the receiving plane, which additionally and in a complementary manner can have a reception sensor (22); in addition, cameras (26) are also arranged on the tanker.

Figure 2:
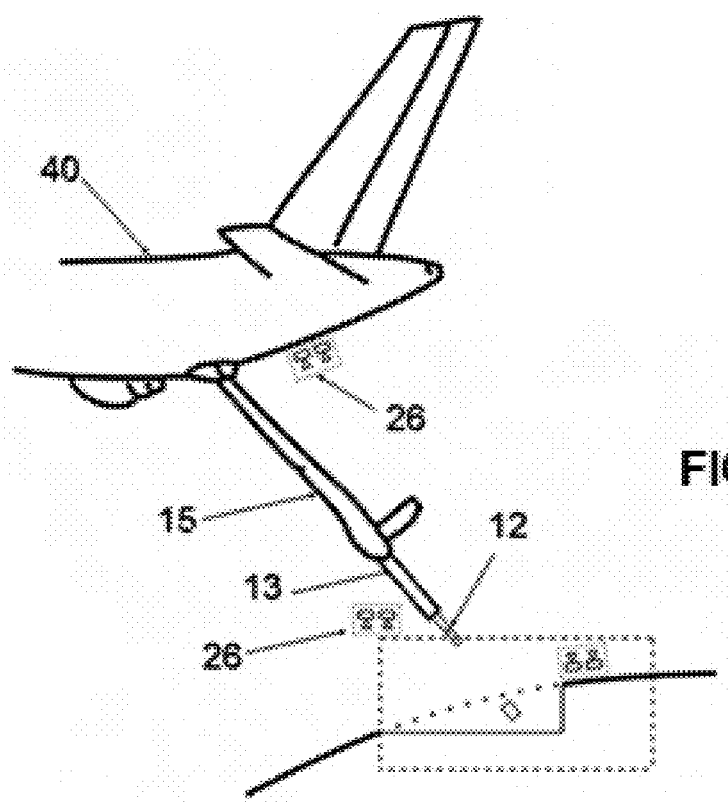
In FIG. 2, we can observe a simplified representation of the System for Approaching and Locating the end of the Boom and the mouth of the Vessel.
Figure 3:
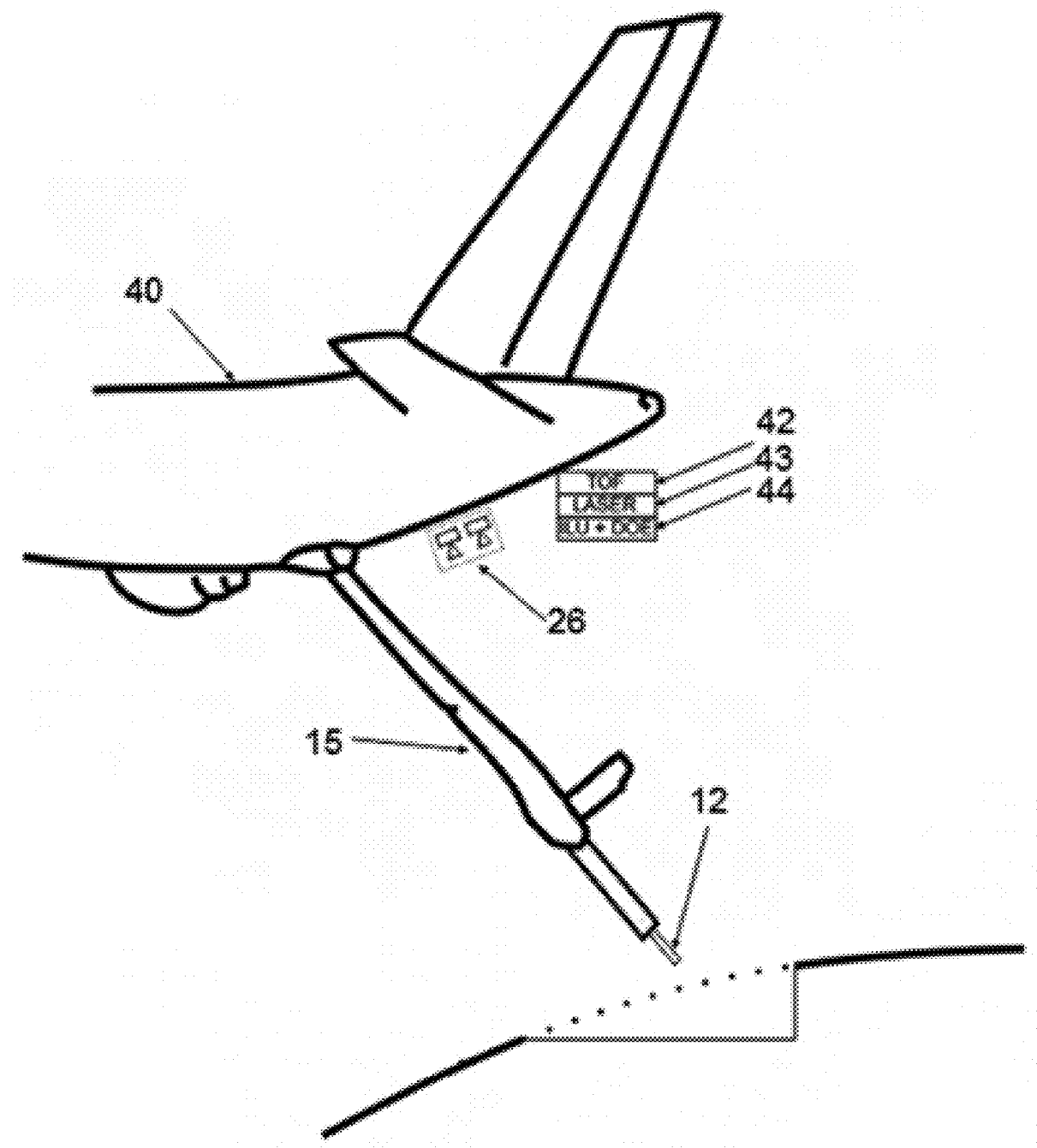
In FIG. 3 an alternative embodiment of the Location System to that found in FIG. 1 is proposed.

FIG. 2 shows an embodiment corresponding to the System for approaching and locating the end of the boom and the mouth of the vessel, which comprises locating devices (41) arranged on the tip of the boom (15), another on the vessel and another on the tanker (40), where each locator device (41) comprises the following:

At least three LED- or Laser-type light emitters
At least two high-speed vision cameras
Electronic equipment that processes the coordinates
A light sensor with its respective lens FIG. 3 shows an alternative embodiment to that proposed in FIG. 1, where the means for locating the vessel used consisting of light emitters (21), have been replaced by the use of any of the following means, which also serve to locate the vessel (a ToF camera (42), a laser emitter (43), and a DOE pattern (44))

FIGS. 4A, 4B and 4C represent the three different elements or Subsystems that make up the Location System of the end of the boom and the mouth of the vessel.

In FIG. 4A we can see an element (5) that grabs the receiving plane just above the fuel vessel. Known as a Vessel Device, it has an inverted "U" or "V" shape and a structure (5) in which there are at least three lights (2) that are found on its surface. This element has a connection cable (7) which ends in a connector to join with the control part of the aircraft.

FIG. 4B shows the so-called boom device, located at the end of the boom (20), consisting essentially of a ring (19) for fixing and protecting it, and light emitters (12) for locating it.

In FIG. 4C we can see a set of two cameras (26) which when placed in a suitable position on the tank will allow the other devices of this invention to be seen and located, and which constitutes the so-called Vision Subsystem. The two chambers are joined and fixed by means of a support (28), each chamber being provided with its respective lenses (25) and filter element (24).

FIG. 5A shows the Vessel Device in more detail in which a reception sensor (22) placed on the structure (5) can be seen and which allows information to be received in the form of light coming from the Boom Tip Device when the tip of the boom and the vessel have come together. In addition, the Vessel Device has a series of light emitters (21), with both elements (21) and (22) embedded in a transparent or translucent material (23). Underneath the vessel device the mouth (8) of the vessel (9) is shown, in which the nozzle of the boom (9) must be fitted.

FIG. 5B shows a cross section of the vessel device, where the structure (5) is visible, along with a transparent or translucent material (3) that protects the light emitter (2) placed on a printed circuit (4) where the rest of the electronics used with it can be found.

FIG. 5C represents a cross-sectional view of the same part of the receiver, showing the structure (5) of the vessel device provided with an inclination similar to that which would be found in a cut section of the receiving plane in the area of the vessel, along with the light reflector emitters (21) and the end (6) of the vessel mouth, where the segment (b) represents the distance from the centre of the closure of this to the midpoint of the segment joining the two light emitters which are found in the mid-zone of the device, while (a) the distance from the same central point of the mouth of the vessel to the upper light (21) of the device on an axis orthogonal to the axis of the same vessel is shown. Finally □ is the angle between both segments described above, (a) and (b).

Figure 7:
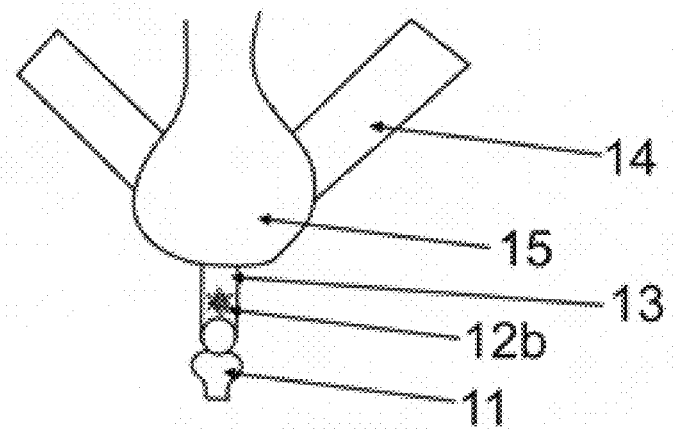
FIG. 7 represents the image obtained from the boom when the Vision Subsystem is placed in the Belly Fairing located on the underside of the tanker.

FIG. 5D is a Cartesian representation of the elements described above. The axes refer to a local origin O" and should later refer to the origin O located in the centre of the image sensor of the left chamber, as shown in FIG. 7. P' is the midpoint between the lights P2 and P3 and $u_o$, $v_o$ and $w_o$ are versors (unit vectors) in the directions of the different axes. The O"-P' axis is the same axis as the vessel tube axis.

Figure 6:
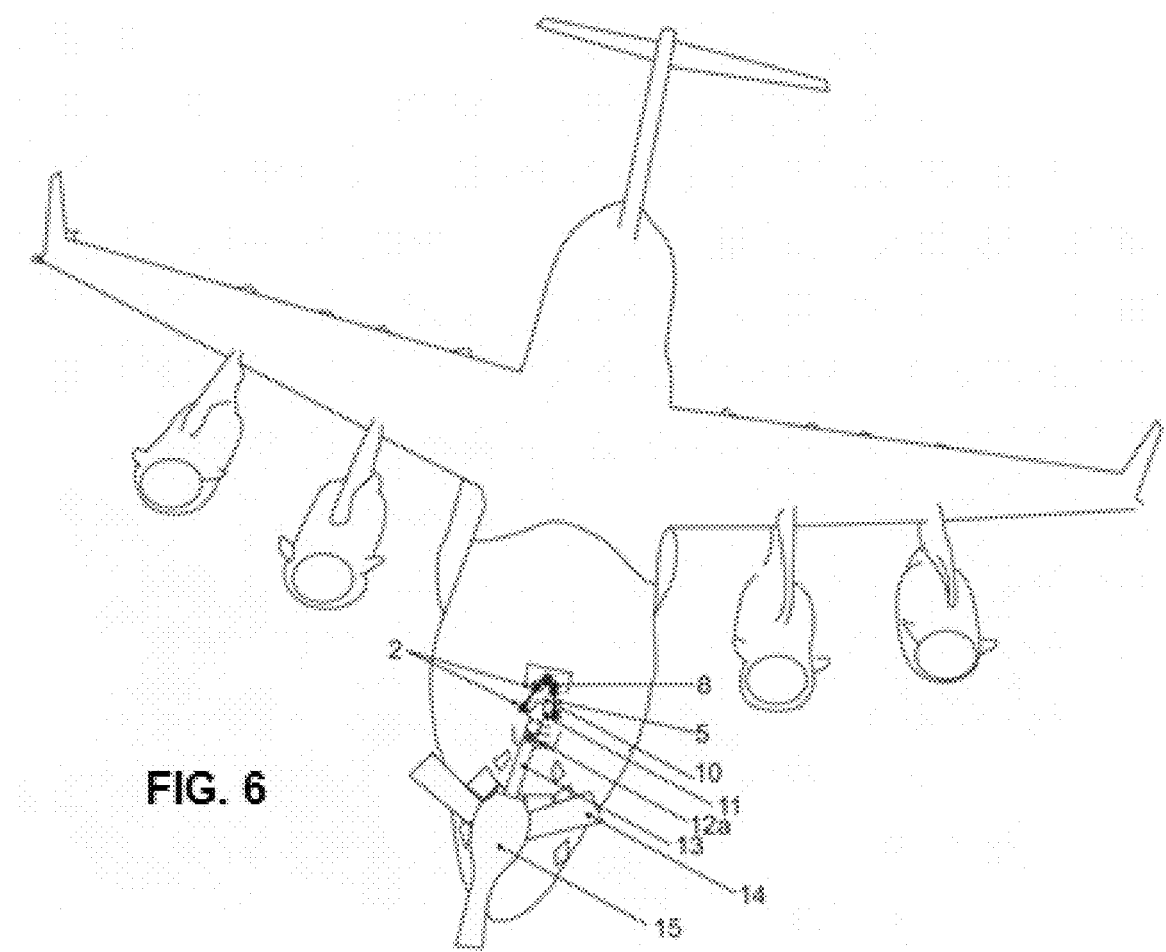
FIG. 6 represents a receiving plane at the moment in which the boom (15) is about to make contact.

FIG. 6 represents a receiving plane at the moment when the boom (15) is about to make contact with the mouth of the vessel (8). The view represents the image when the Vision Subsystem is located in the preferred position in this invention placed in the tail cone. It shows: Boom flap (14), extendible part (13) of the boom, device lights (12a) of the end of the boom of this invention placed on top of the extendible pole for this preferred implementation. The nozzle (11) and ramp (10) of the vessel on which the nozzle is usually slid before contact can also be observed.

FIG. 7 represents the image obtained from the boom when the Vision System is placed in the Belly Fairing located on the underside of the tanker. The figure shows the nozzle (11), the extensible part (13) of the boom, the end of the boom (14) and the fixed part (15) of the boom from the bottom of the tanker. It also shows the location (12b) of the illumination ring of this invention when the Vision System is positioned as described above. Both points of view generate images of the contact, each with its own drawbacks and advantages. The Boom device could contain six or more light emitters and, in this way, allow the Vision Subsystem to be placed in the two indicated locations (Tail Cone and Belly Fairing), with which complementary images would be obtained that may generate an interesting redundancy, which is very useful for these types of Systems.

Figure 8:
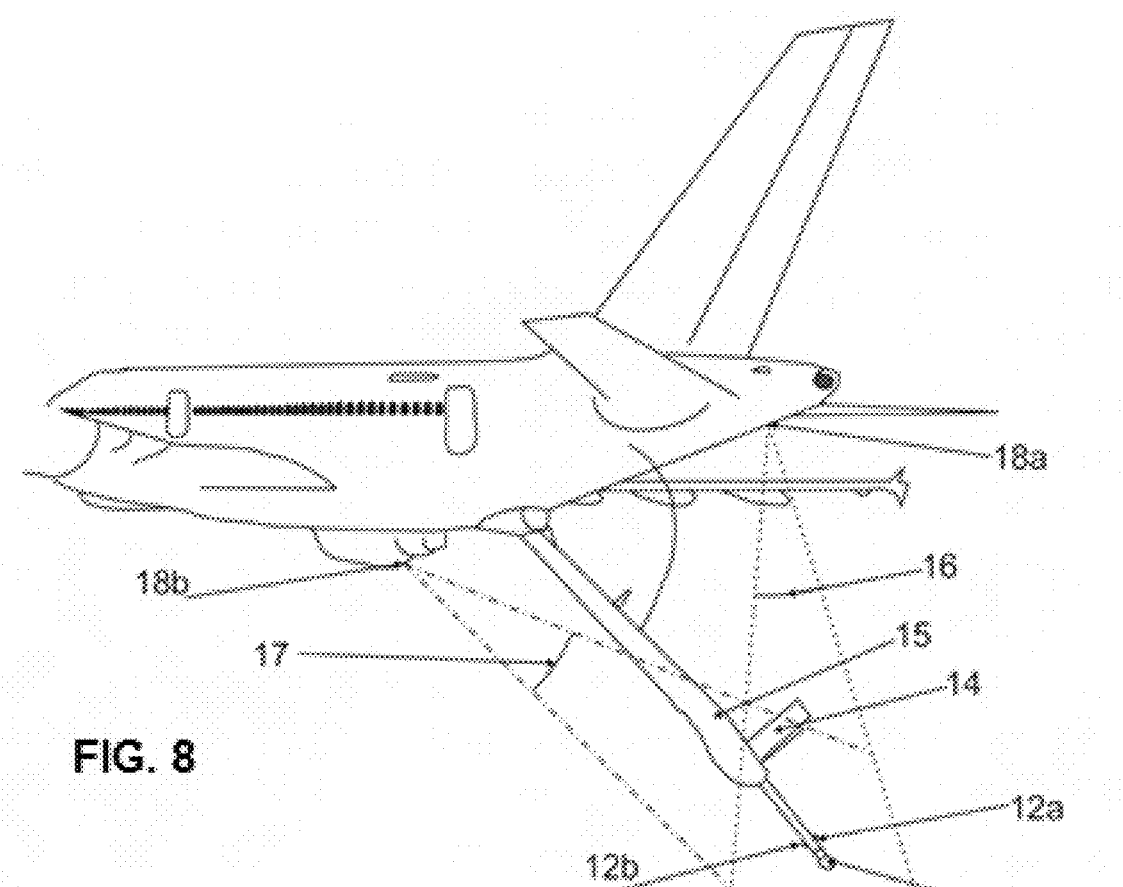
FIG. 8 shows a view of the tanker aircraft as well as its deployed boom.

FIG. 8 shows a view of the tanker aircraft as well as its deployed boom, to indicate the two positions in which the Vision Subsystem can be located. The first situation corresponds to its (preferred) placement in the tail cone (18a), while the second situation corresponds to its location under the Belly Fairing (18b), the underside of the tanker. Said locations correspond, as already mentioned, to various implementations of the boom's illumination ring, which can be arranged either in the rear part (12a) or in the front part (12b), corresponding to the locations (18a) and (18b) of the cameras. Each of the cameras, depending on its positioning in the tail cone (18a) or on the underside of the aircraft (18b), define the fields of vision (16) and (17) respectively according to the specific location.

Figure 9:
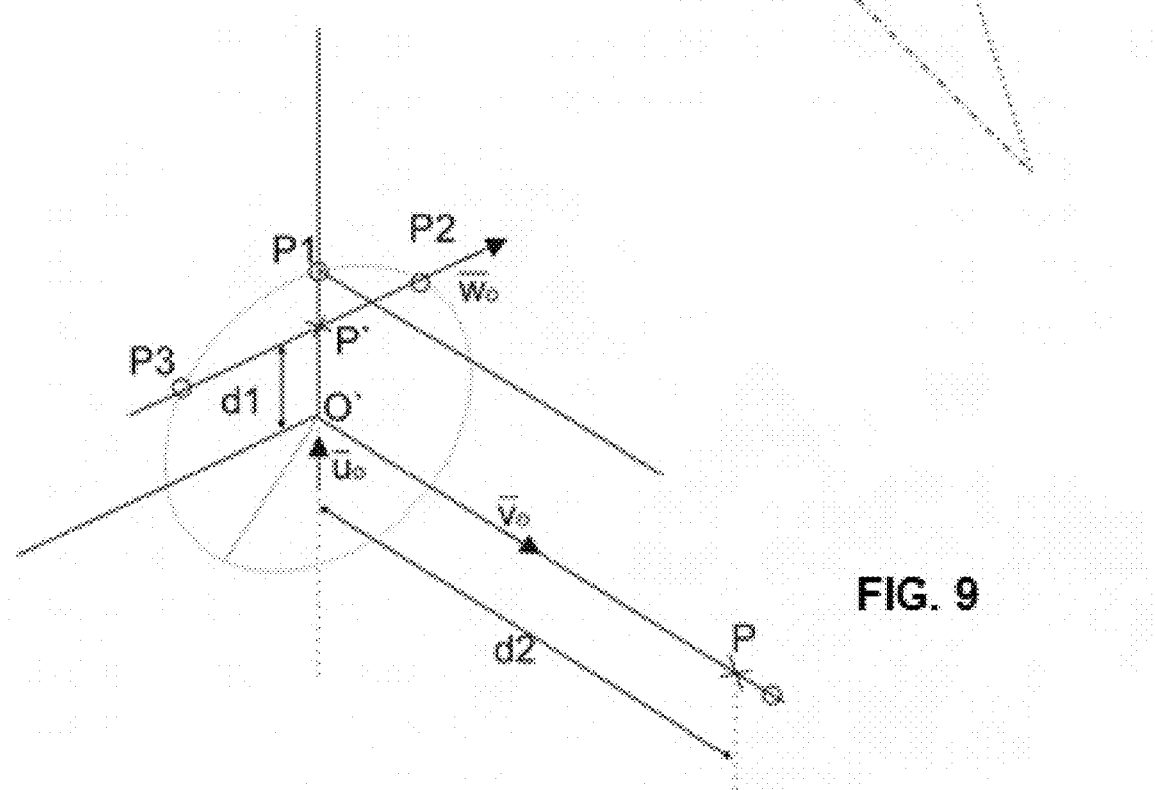
FIG. 9 is a Cartesian and schematic representation of the locations of the most important elements that form part of the Boom Device.

FIG. 9 is a Cartesian and schematic representation of the locations of the most important elements that form part of the boom device consisting basically of a metal ring or a similar support element, in which at least three light emitters P1, P2 and P3 are embedded, placed forming a triangle. Point P' is the midpoint between the outermost light emitters P2 and P3. O' is the chosen local origin of the coordinates. Once again, there must be a movement in order to be able to refer any point to the global origin placed in the centre of the image sensor of one of the cameras; $u_o$, $v_o$ and $w_o$ are versors (unit vectors) in the directions of the different axes, d2 is the distance from the centre of the fuel outlet nozzle of the boom to the local O' origin that can be determined by knowing the distance P'O' which measured in the device will have a value, d1. $v_o$ is a versor in the direction of the Boom axis.

Figure 10:
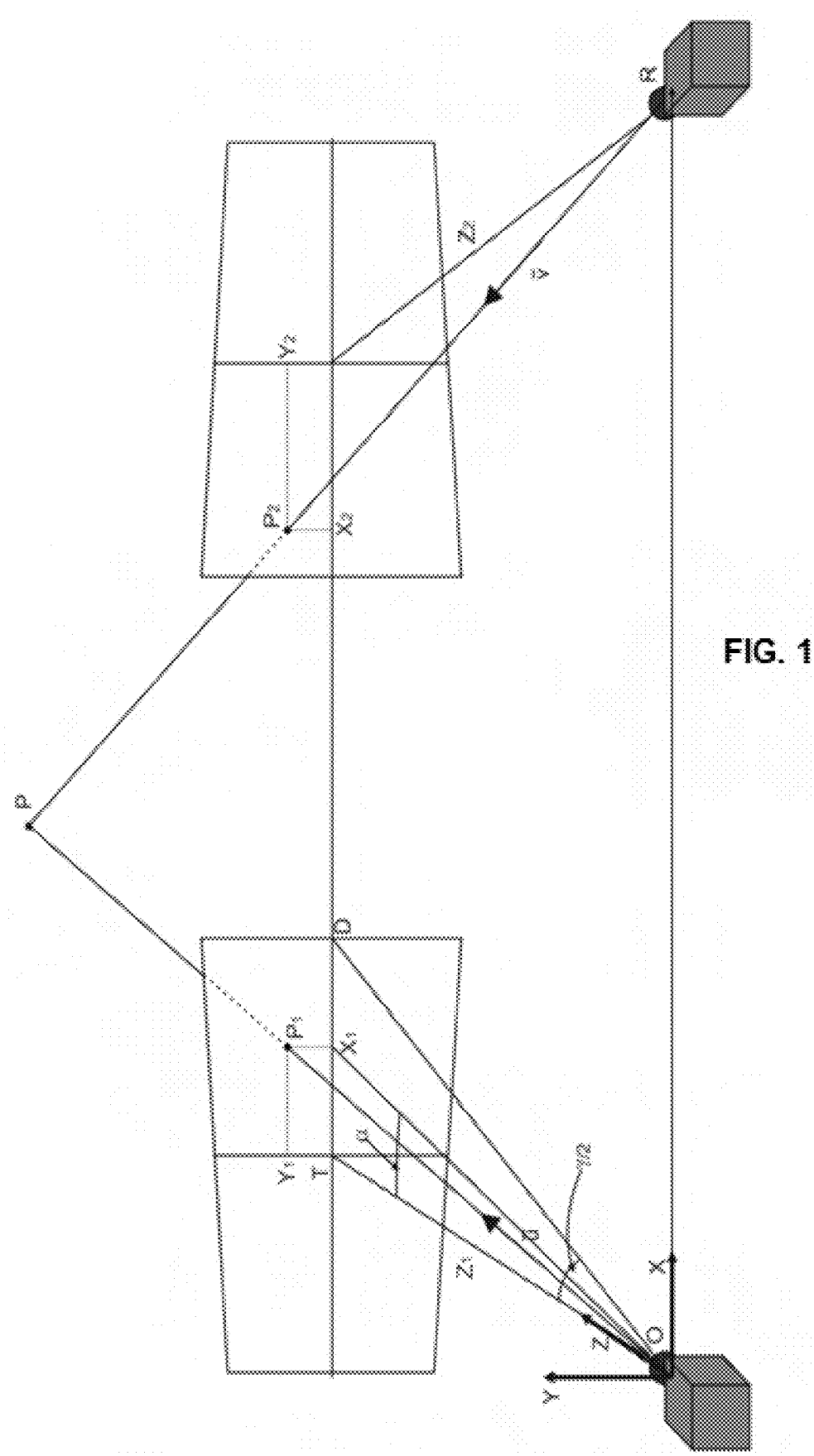
FIG. 10 is a Cartesian representation of the Vision Subsystem.

FIG. 10 is a Cartesian representation of the Vision Subsystem. In this drawing, both cameras can be seen as well as what they would show when aimed at a point P of the space. Each camera will see the point with different local coordinates (X1, Y1) and (X2, Y2) in which the point will appear as point P1 and P2 respectively. The Z coordinate in each of the local representations can be calculated from the angle □/2 corresponding to half of the FoV (Field of View) of each camera which will depend on the optics and resolution of the camera as well as the size of its sensor. Once Z1 and Z2 are found, local to the point for each chamber, Z, X and Y of the point will be obtained with respect to a predetermined reference origin. In our case, the centre or origin O that we have placed, without the loss of generality, is in the centre of the sensor of the left chamber, as shown in the figure. This will give us the coordinates of any point observed by both cameras with respect to the same coordinate axes and therefore the real relative coordinates between them.

Figure 11:
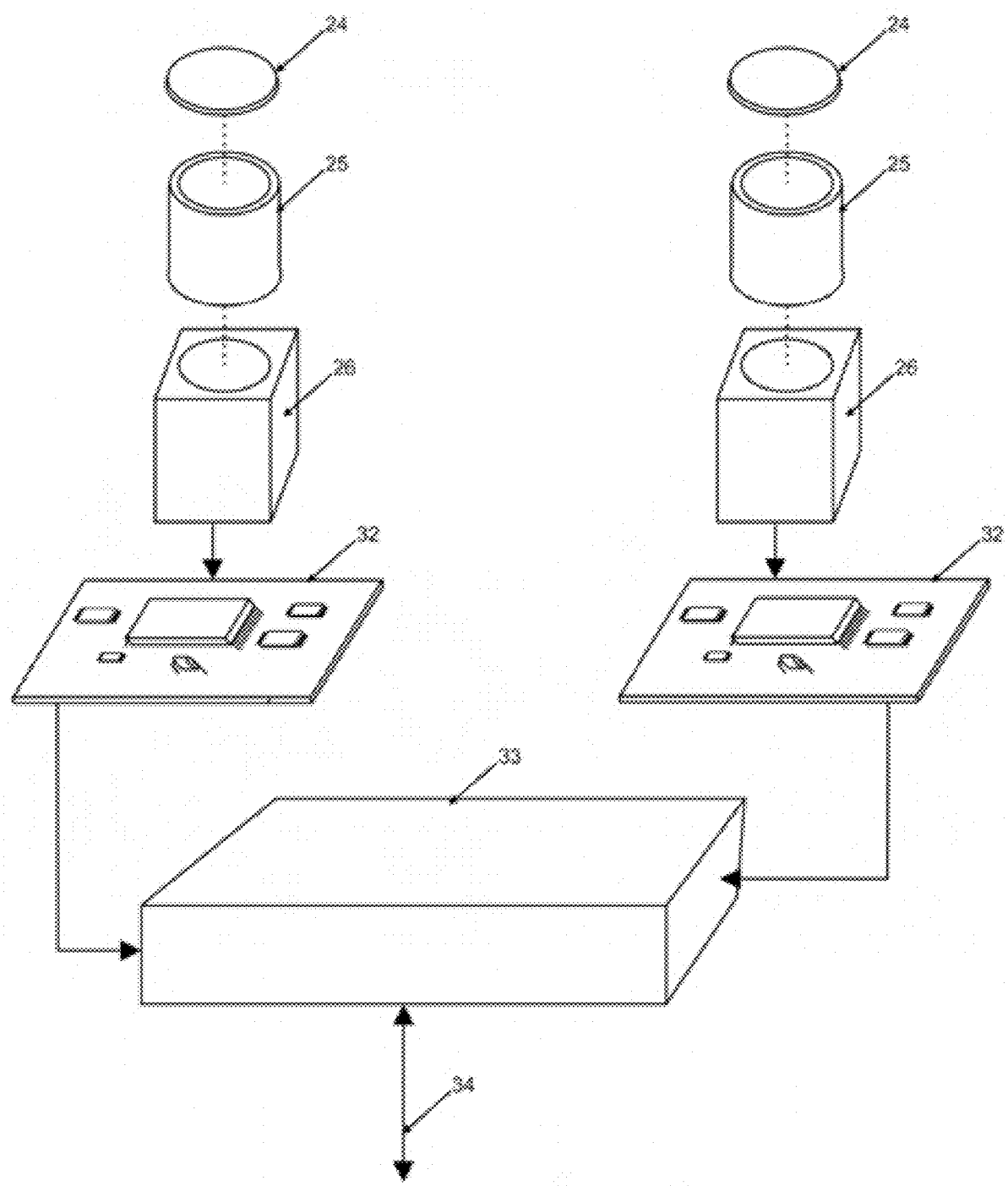
In FIG. 11 the architecture of the Vision Subsystem is represented.

FIG. 11 shows the architecture of the Vision Subsystem, which includes the main components that make up its architecture. A preferably metallic outer aluminum enclosure includes two chambers separated by a distance of about half a metre (the greater the distance, the better the spatial resolution on the z-axis). Each camera (26) has sensor and electronics for adapting and reading, to which a lens (25) and filter (24) must be placed beforehand to eliminate the wavelengths which differ from those emitted by the Boom and Vessel devices. It includes special electronics (32) based on FPGA in order to obtain results in real time and which performs a processing and image recognition and extraction of local coordinates xi, yi of the points of light of the indicated devices.

The coordinate information of both cameras is transferred to a Processing System (33) where finally the X, Y, Z coordinates of each light emitter is obtained with respect to a coordinate axis whose origin has been taken at the centre of the sensor of the left camera for greater ease, notwithstanding the use of any other.

Figure 12:
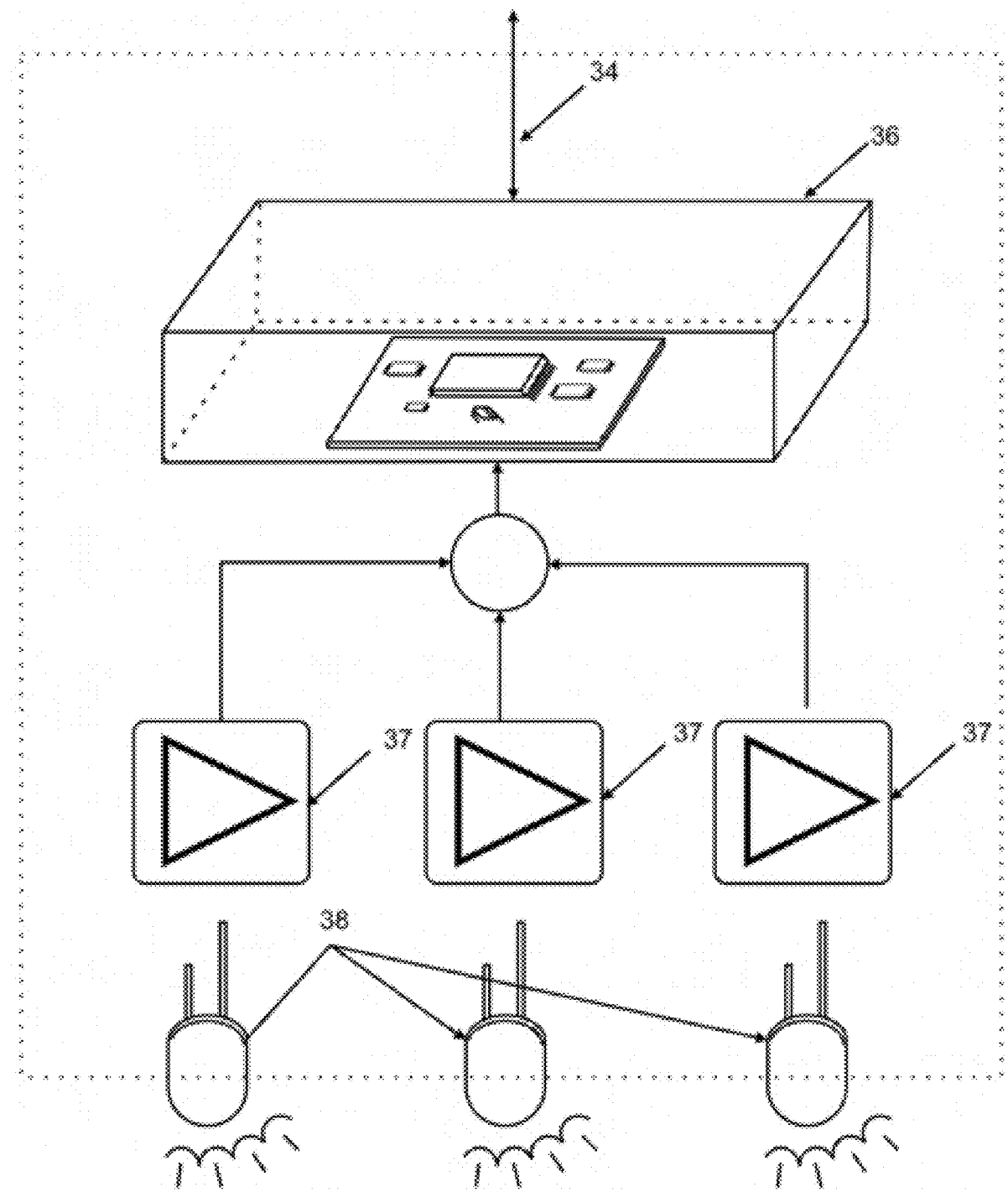
FIG. 12 represents a box in which the elements that form part of the Boom Device are included.

FIG. 12 represents a box in which the elements that form part of the Boom Device are included. Essentially, it is comprised of light emitters (38), which are LEDs in this preferred implementation, at least three, powered by their respective drivers (37) which are in turn handled by a microcontroller (36) which in turn connects with the Vision Subsystem through a control bus with its respective communications electronics (34). The control bus will be synchronised with the Vision Subsystem in order to obtain the position of the Vision Subsystem light emitters.

Figure 13:
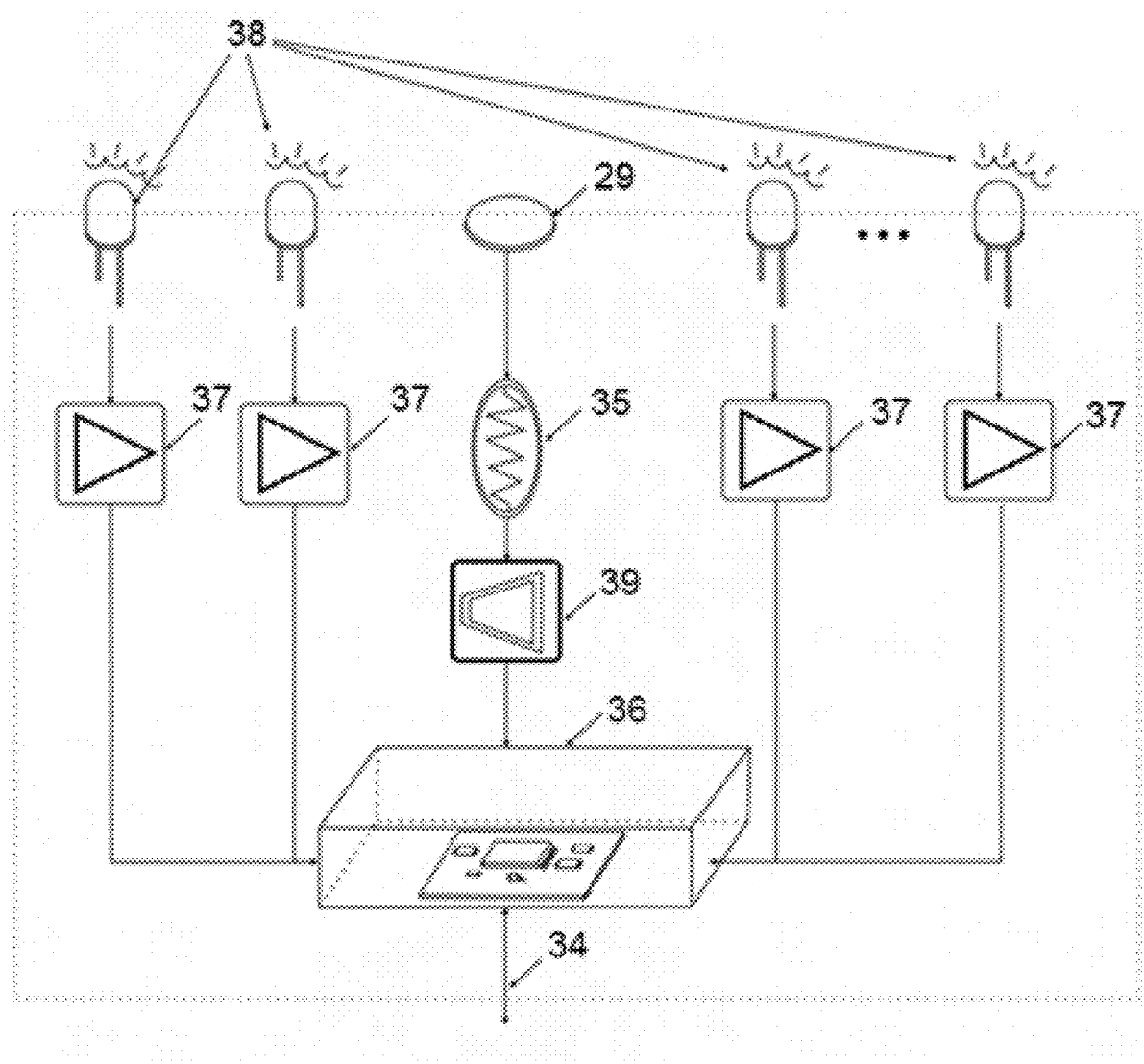
In FIG. 13 the composition of the Vessel Device is described.

In FIG. 13 the composition of the Vessel Device is described. In it, in this preferred implementation, a set of LEDs (LED1, LED 2, LED3, LEDn) (38) at least 3, are powered by their respective drivers (37) and these are activated and deactivated by a microcontroller (36) which will be controlled remotely. This device can be turned on or off from the console of the receiving plane. Additionally, a sensor (35) will receive light through its corresponding filter (29) in order for the signal adapter element (39) to provide the microcontroller (36) with information on the pulses received therein and coming from the boom device. The device may store the received information in a non-volatile memory. The microcontroller, which has a processing algorithm, not only controls the lighting of the LEDs but, in addition to the information received from the light sensor (35), it can extract both information about the position of the device with respect to the boom device and about audio information, which could be inserted in the sequence of pulses emitted by the latter. Finally, a communication bus allows this device to be controlled from the receiving plane, as already mentioned.

Figure 14:
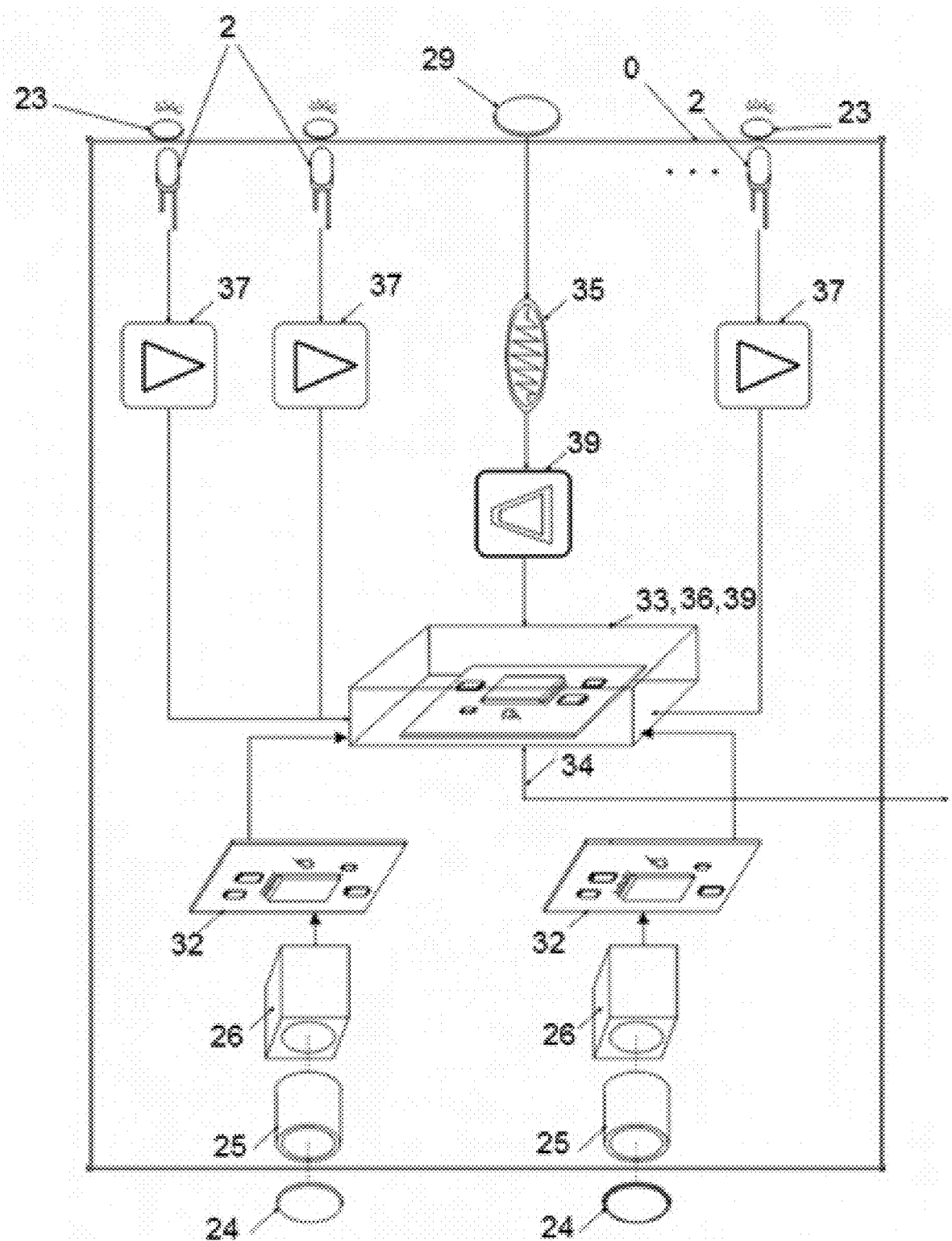
In FIG. 14 a representation of the Locating Device for refueling is shown.

FIG. 14 shows the structure of a Location Device (41). The device is enclosed in a box (0) and consists of a set of at least three light emitters (2) with their respective diffusers (23) fed by their corresponding drivers (37). Two cameras (26) with their corresponding lenses (25) and narrow band-pass optical filters (24). Both cameras (26) and light emitters are controlled by a control electronics unit and the information from the first (26), as well as that coming from the light sensor (35) provided with its optical band pass filter (29), is processed by a real-time processing unit based on FPGA or similar electronics (33, 36, 39). The cameras have their own electronics for calculating the coordinates of the points of light coming from another Location Device in real time. The device communicates with the exterior through a communications bus (34) and is powered by a power source from the plane, which is not shown in the drawing.

Detailed Functioning of the System:

In the case that the vessel (FIG. 6.10) placed on the surface of the fuel receiver is in a position that can be seen by the subsystem of the two cameras (FIG. 4C) placed in a favourable position on the tanker (such as the tail cone (FIG. 8-18*a*) or the belly fairing (FIG. 8-18*b*)), cameras placed on the Vessel Device and pointed in the opposite direction could show the tanker and more specifically the tanker's vision system. Next to it, the light emitters of the tanker have been placed, which will emit their corresponding pattern from this position that will be captured by the cameras next to the Vessel Device. In this way, the receiver can locate the tanker and approach it in order to get into the refueling position. (This is one of the features pursued by this invention).

Even before reaching that placement in the refueling position, the lights placed on the device (FIG. 4A.5) that are on the upper side of the vessel, or distributed in another alternative implementation, on the surface of the receiving aircraft, begin to blink with a cadence corresponding to a certain code. This flashing has two modes of operation or two particular functionalities, the first is a blinking at a fixed frequency that matches the frame rate of the cameras and the second is a different frequency with about 48 KHz as the preferred value and that allows coded voice information to be sent to the Boom Device which, with a suitable optical filter in front of its sensor (FIG. 14-29) is able to eliminate the information light not related to the device from the signal received. It is obvious that the narrower the bandpass filter and the more coherent the light emitted (FIG. 13-38), the easier it will be to eliminate the unwanted light. The pattern sent by the light emitters allows an additional aid to distinguish which pixels of the images obtained by the cameras of the Vision Subsystem placed in the tanker correspond to the illumination generated by the light sources of the vessel device. The image processor (FIG. 11-32) placed behind the cameras, within the Vision Subsystem, will subtract the images from successive frames of the video to obtain the differences between one image and the next and thus be able to show with greater clarity the points that vary from one frame to the next. These differences will be correlated with the code used for the blinking of the lights to thereby further facilitate the task of detecting each of the lights placed on the device, as well as to identify each of them in both cameras.

Once the light from the emitters of the vessel device are received as coordinates in the Vision Subsystem cameras, the coordinates of these emitters will be calculated using simple mathematics which allows it to be included in the electronics and recalculated in the image time frame (FIG. 11-33).

Thereby, using the coordinates of the lights, the location of the vessel mouth (FIG. 5B-5) will be obtained along with the vector orthogonal to the mouth with respect to the coordinate axes referring to the tanker and more specifically with respect to one of its cameras. (This is the second important functionality pursued by this invention).

At the same time, the lights placed on the boom, near the nozzle (FIG. 4B-12) or (FIG. 6-12*a*) or (FIG. 8-12*b*) will be flashed in a similar manner, although not identically, to those of the vessel device, and their positions with respect to the same system of tanker coordinates can be determined through a completely analogous procedure. From this position we can precisely determine the coordinates of the end of the nozzle through which the fuel leaves as well as the vector orthogonal to the nozzle's output section. (This is the third important functionality pursued by this invention).

Initially, we had the position of the tanker from the receiver and now we have the relative position of the vessel mouth and of the boom outlet tip, with both referring to the same tanker reference axes. Through control laws that either govern or aid the movement of both the boom and the receiver plane itself, a semi-automatic or even automatic guidance can be implemented to improve the operation. When the connection is made, both sets of coordinates must match and it will be time to make the adjustments considered appropriate, as in other implementations of this invention, the calculation of the vessel mouth position may not be as obvious as that corresponding to the preferred implementation of this, since the light emitters could be distributed along the surface of the receiver. This could have other advantages. During this moment of actual contact, the information on the position of the lights is exactly that desired for the contact and the fact that it can be stored is very interesting; something that this invention accomplishes thanks to the communication established between the receiving plane's vessel device and the tanker's Vision Subsystem. The receiver uses the light from its emitters as a carrier to send encrypted digital information to the Vision Subsystem. At the same time, the Boom device can send information, not only to the Vision Subsystem, but also to the vessel device where the light sensor placed in it will close the communication loop between both aircraft. The receiving aircraft may store the situation information from the contact and other relevant auxiliary information that may be of interest to the tanker in relation to it.

Once the position is stored, and during a future connection between tanker and the same receiver, the latter will be able to tell the tanker what position the vessel should be in for the exact connection to take place. In addition to that exchange of location information, this channel can be used for spoken communications, thus avoiding any radio signal that could be detected more easily than an optical signal.

Another important functionality of the invention is the possibility of performing a duplex voice communication between receiver and tanker. That is, between the Vessel Device and the Boom Device. Both have two ways to turn on their respective light emitters. One to send the position and another to send and receive a signal of tens of kHz, enough to carry a voice signal. And this can occur in both directions, provided both devices are equipped with the respective light sensors.

Therefore, the stages that take place for the correct functioning of the System include:

- Visualization from the Vessel Device cameras of the lights placed in the tank that flash, generating patterns following the frame frequency of these cameras.
- Determination of the position of the tank with respect to the Vessel Device cameras, in order to facilitate the approach of the receiving aircraft.
- Positioning of the receiving plane with respect to the tank to allow refueling. In this position the receiver can be seen by the tanker cameras.
- Blinking of the lights arranged on the Receiving Device with a certain cadence that has two modes of operation; the first being a blinking with a fixed frequency, which coincides with the frame frequency of the cameras with which it performs a pattern emission; and the second being a different frequency of about 48 KHz as the preferred value and which allows encoded voice information to be sent to the Boom Device.
- Determination of the position of the vessel mouth with respect to the tanker:
  - Elimination in the cameras of the frame image of the light not related to the device by means of the optical filters that the cameras have.

Subtraction of the images from the successive frames of the video by an image processor to obtain the differences between one image and the next one and thus be able to show with greater clarity the points that vary from one frame to the next.

Correlation of the differences with the pattern code used for the blinking of the lights to determine the lights that are relevant.

Calculation of the coordinates of these emitters through simple mathematics that allow it to be included in the electronics and recalculated in real time.

While the previous operations take place, the lights placed on the boom close to the nozzle will be made to flash in a similar way and with a similar management to the previous one for the Vessel Device. In doing this, they will also be able to emit information not only on the position but also voice information.

Determination of the position of the boom lights with respect to the same tanker coordinates system.

Determine exactly the coordinates of the end of the nozzle with respect to the tanker.

Determination of the relative positions between both significant points: Boom tip and vessel mouth as well as the vectors orthogonal to their surfaces.

Calibration: Determination of the Relative Position of Contact and Storage Thereof During the moment of contact between the boom nozzle and the vessel, the set of cameras (which will be placed preferably on the bottom of the tail cone of the tanker, although they could also be placed on the bottom of its main body, the Belly Fairing, or distributed along this and on more parts of the plane), the set of lights of the device that is the object of this invention will be able to be seen from the shortest possible distance (which is the moment of contact), mainly the vessel device placed on the surface of the plane receiver. Said device may have the form presented here as the preferred implementation but could also be distributed in several pieces arranged on the surface of the receiver. This device could even be replaced by a system that obtains the position of the vessel by alternative methods. The first task of this invention is to obtain the position of the point that is in the mouth of the vessel together with a vector perpendicular thereto. In such a way that, from the information gathered by the Vision Subsystem on the position of light emitters or alternative methods and elements, these six parameters must be obtained. Therefore, the moment of contact is a safe time in which we will truly know the relative position between the information obtained from the Vessel Device, in any of its implementations, and the vessel mouth and its orthogonal vector. At that moment the cameras will be able to determine with the maximum accuracy where the nozzle should be placed with respect to the set of lights or other elements, and from this determine with the same precision the location of the vessel with respect to them. This information is fundamental and will allow the calibration of the entire System. This is why, during this moment of contact, the information on the location in which the vessel is found is completely accurate and must pass from the tanker to the receiving aircraft which will store it in order to provide it to other tankers.

Receiving Location Information

At the time of contact, as already mentioned, the distance between the tip of the boom and the vessel of the receiving plane is particularly favourable.

In the device object of this invention that is placed next to said vessel there is at least one light receiving sensor that will receive the information that will be sent from the nozzle of the boom in the form of light in a preferred implementation. In this way, the receiver can receive the information obtained in the tanker at the time of contact and store it, in order for it to be sent by its active element or elements during a future point of contact, when another tanker so requests. In addition, the same tanker can store this information for future points of contact, since it can be kept in a small database for all those recipients with whom contact has been made. Not only can the contact data be stored, but the vessel can also transmit other fuel data, etc. to the tanker, which will be stored in the database.

Having sufficiently described the nature of the present invention, as well as the manner of putting it into practice, it is noted that it may be implemented in other embodiments that differ in detail from that indicated by way of example, and to which it will also reach the protection sought, provided that it does not alter, change or modify its fundamental principle.

What is claimed:

1. A system of locating a boom (15) tip and a receiving vessel during a mid-flight refueling operation that conveys fuel from a tanker to a receiving plane, comprising:
   a tanker (40) equipped with the boom (15) that includes a boom tip;
   the receiving vessel with a vessel device (5) and fuel inlet mouth, the receiving vessel being attachable to a receiving plane, the vessel device being made from a material chosen from the group consisting of steel, titanium, Teflon® or Kevlar®, and the vessel device being constructed with a semi-hollow band that includes at least four transparent zones made from a material chosen from the group consisting of graphene or aluminum oxide, and each zone having a light-emitting element embedded therein;
   means for locating a position of the fuel inlet mouth that includes plural light emitters; at least one vision subsystem arranged on the tanker, and including at least two cameras (26);
   means for locating a position of the boom tip, including plural light emitters placed on the boom tip, and constructed to operate in cooperation with the vision subsystem; and
   processing means configured to determine, through images obtained from the means for locating the position of the fuel inlet mouth and the means for locating the position of the boom tip, to determine the positions of the fuel inlet mouth and the boom tip with respect to a common coordinate system.

2. The system according to claim 1, wherein a sensor that receives and detects light from another device is contained in one of the transparent zones.

3. The system according to claim 1, wherein the means for locating the position of the fuel inlet mouth includes a Time of Flight camera (42) located in the tanker (40), and constructed with lighting means and a sensor that measures the time it takes for an emitted light takes to return from the receiving vessel, the means for locating the position of the fuel inlet mouth further including a processing system constructed to determine the position of the fuel inlet mouth by recognizing the position of the receiving vessel or by making a comparison of measurements from the Time of Flight camera and a 3D model of the receiving vessel.

4. The system according to claim 1, wherein the means for locating the position of the fuel inlet mouth includes a laser emitter (43) placed on the tanker (40) and including a lens chosen from the group consisting of a diffractive optical elements lens and a diffraction lens that generates a known pattern of light, located on the surface of the receiving plane, and further comprising a processing system which is configured for determining the correspondence between points of a matrix and the same points in an image obtained by the cameras by means of telemetry to obtain distances from the receiving plane and, using the distances, for performing an image recognition or a comparison of the points in the image obtained by the cameras and a 3D model of the receiving plane to obtain information corresponding to the location of the fuel inlet mouth.

5. The system according to claim 1, wherein the means for locating (41) the position of the boom tip includes a boom device with a box that is attached to the boom (15) or to an extendable bar (13) of the boom, the box containing at least three light emitters, each emitting a narrow range of wavelengths, each including a diffuser (23), and each powered by respective drivers (37) that are connected to a power source through a control electronics unit and wherein the boom device is controlled remotely and constructed to generate light patterns from a frame frequency of the cameras.

6. The system according to claim 5, wherein the light emitter of the boom (15) device and vessel device (5) are capable of emitting light and the at least two cameras (26) of the vision subsystem are constructed to be sensitive to the wavelength emitted by the boom (15) device and vessel device (5), the at least two cameras (26) are located in a rigid support to fix a location for the at least two cameras, the at least two cameras each include an optical band pass filter, a focus lens located behind the filter and electronics for processing and extracting both the image and information relative to the coordinates (x, y) of each point of light emitted by each light emitter of the boom (15) device and vessel device (5).

7. The system according to claim 1 wherein the light emitters (2) are the terminal ends of an optical fiber that transports light from the emitters.

8. The system according to claim 1, wherein the vision subsystem has controllable and variable focusing cameras.

9. The system according to claim 1, wherein the vision subsystem includes controllable and variable Iris cameras.

10. The system according to claim 1, wherein at least the vision subsystem includes controllable and variable zoom cameras.

11. The system according to claim 1, wherein the means for locating the position of the boom tip is integrated into the boom (15).

12. The system according to claim 1, wherein the means for location the position of the fuel inlet mouth is integrated into the receiving vessel.

13. A system of locating a boom (15) tip and a receiving vessel during a mid-flight refueling operation that conveys fuel from a tanker to a receiving plane, comprising:
 a tanker (40) equipped with a boom (15) having a boom tip;
 a receiving vessel (9) attachable to a receiving plane and having a fuel inlet mouth (8) for receiving fuel located inside the receiving vessel;
 three locating devices (41), a first one being located on the receiving vessel, a second one being located under the tanker and a third one being located on the boom tip, wherein each locating device (41) is constructed with:
 at least three light emitters (38), each having a diffuser and a driver (37) for powering the driver;
 a microcontroller (36) for the at least three light emitters;
 at least two high-speed vision cameras (26), each having a frame rate greater than 30 fps and each having a respective lens (25) and a narrow bandpass optical filter (24) tuned to light that is emitted by another locating device, and each of the cameras including high-speed, field-programmable gate arrays to determine in real time the coordinates of the points of light emitted by the other locating device; and
 a light sensor (35) having a lens and being capable of detecting light from another locating device (41) when the other locating device (41) is nearby;
 electronic equipment (33,36,39) including a communication bus, the electronic equipment being constructed to process and save coordinates provided by the at least two cameras to obtain the relative coordinates of each emitter with respect to one of the cameras.

14. A system of refueling a receiving plane from a tanker, where the receiving plane includes a receiving vessel, plural cameras that each include optical filters and an image processor, and light emitters, and the tanker (40) includes a boom (15) and boom tip with plural light emitters, comprising: visualizing the tanker from the receiving vessel using the cameras to detect patterns of light emitted by the light emitters that follow the frame frequency of the cameras; determining a position of the tanker (40) from the visualizing step; and positioning the receiving plane adjacent the tanker (40) by the visualizing and determining, thereby to allow the refueling.

15. The system of claim 14, wherein the boom includes a boom tip with associated high-speed video cameras that operate at a frame frequency and constructed to sense, record and encode ambient sound, and the visualizing and determining steps further comprise the steps of:
 making and recording a video with the high-speed video cameras that includes successive frames showing corresponding images;
 blinking the light emitters to produce light patterns with a predetermined cadence by following two modes of operation; the first mode operating at a frequency that corresponds to the frame frequency of the cameras and the second mode operating at a frequency of 48 KHz;
 determining a position of the fuel inlet mouth with respect to the tanker by:
 eliminating from the video all frame images that are not related to the light emitters;
 subtracting successive frames of the video by an image processor to obtain differences between corresponding images of successive frames;
 determining which light patterns are relevant by correlating differences between a pattern code associated with the blinking of the light emitters; and
 calculating coordinates of the light emitters using information detected by the cameras through simple mathematics that allow it to be included in electronics and recalculated in real time;
 simultaneously repeating the blinking for the light emitters on the boom tip to produce light patterns that correspond to the position of the receiving plane and to human voice information;
 determining the position of the light emitters on the boom tip using a tanker coordinate system;
 determining the position of the boom tip with respect to the tanker; and
 determining the relative positions of, and vectors orthogonal to the surfaces of, the boom tip and the fuel inlet mouth.

16. The system of claim 15, wherein the eliminating includes using optical filters.

* * * * *